United States Patent [19]
Porcari et al.

[11] Patent Number: 5,111,896
[45] Date of Patent: May 12, 1992

[54] BELT CONVEYOR WEIGHBRIDGE

[75] Inventors: Vincenzo Porcari; Gianluigi Riva, both of Mipano, Italy

[73] Assignee: Baker Hughes Incorporated, Houston, Tex.

[21] Appl. No.: 685,234

[22] Filed: Apr. 12, 1991

[30] Foreign Application Priority Data

Apr. 20, 1990 [IT] Italy .................. 20091 A/90

[51] Int. Cl.⁵ ............................................ G01G 11/14
[52] U.S. Cl. ...................................... 177/16; 188/187
[58] Field of Search .................................. 177/16, 187

[56] References Cited

U.S. PATENT DOCUMENTS

| | | | |
|---|---|---|---|
| 3,163,248 | 12/1964 | Farquhar | 177/16 |
| 4,557,341 | 12/1985 | Söderholm | 177/16 |
| 4,682,664 | 7/1987 | Kemp | 177/16 |

Primary Examiner—Benjamin R. Fuller
Assistant Examiner—Randy W. Gibson
Attorney, Agent, or Firm—Carl A. Rowold

[57] ABSTRACT

A weighbridge for a conveyor belt assembly for measuring the weight of a section of conveyor belt carrying a load of material to be transported along the conveyor belt assembly is disclosed. The conveyor belt assembly has frame members positioned longitudinally along side the conveyor belt and engages the underside of the conveyor belt to support it. The weighbridge comprises one of these crossmembers, with said member being mounted for generally vertical movement relative to the adjacent frame member and thus constituting a weighbridge crossmember. The weighbridge further comprises a load sensing assembly mounted on the adjacent frame member for supporting the weighbridge crossmember. A bracket member selectively mounts the load assembly on the adjacent frame member moveable between first and second positions. In the first position, the load assembly and weighbridge crossmember are free to move longitudinally and transversely with respect to the frame member within a limited range of movement. In the second position, the load assembly is affixedly secured on the adjacent frame member against movement whereby on installation and adjustment of the weighbridge the mounting means is free to move so as to relieve longitudinal and transverse forces otherwise induced in the weighbridge and prior to use the load sensing assembly is mounted in condition free of such induced forces.

10 Claims, 2 Drawing Sheets

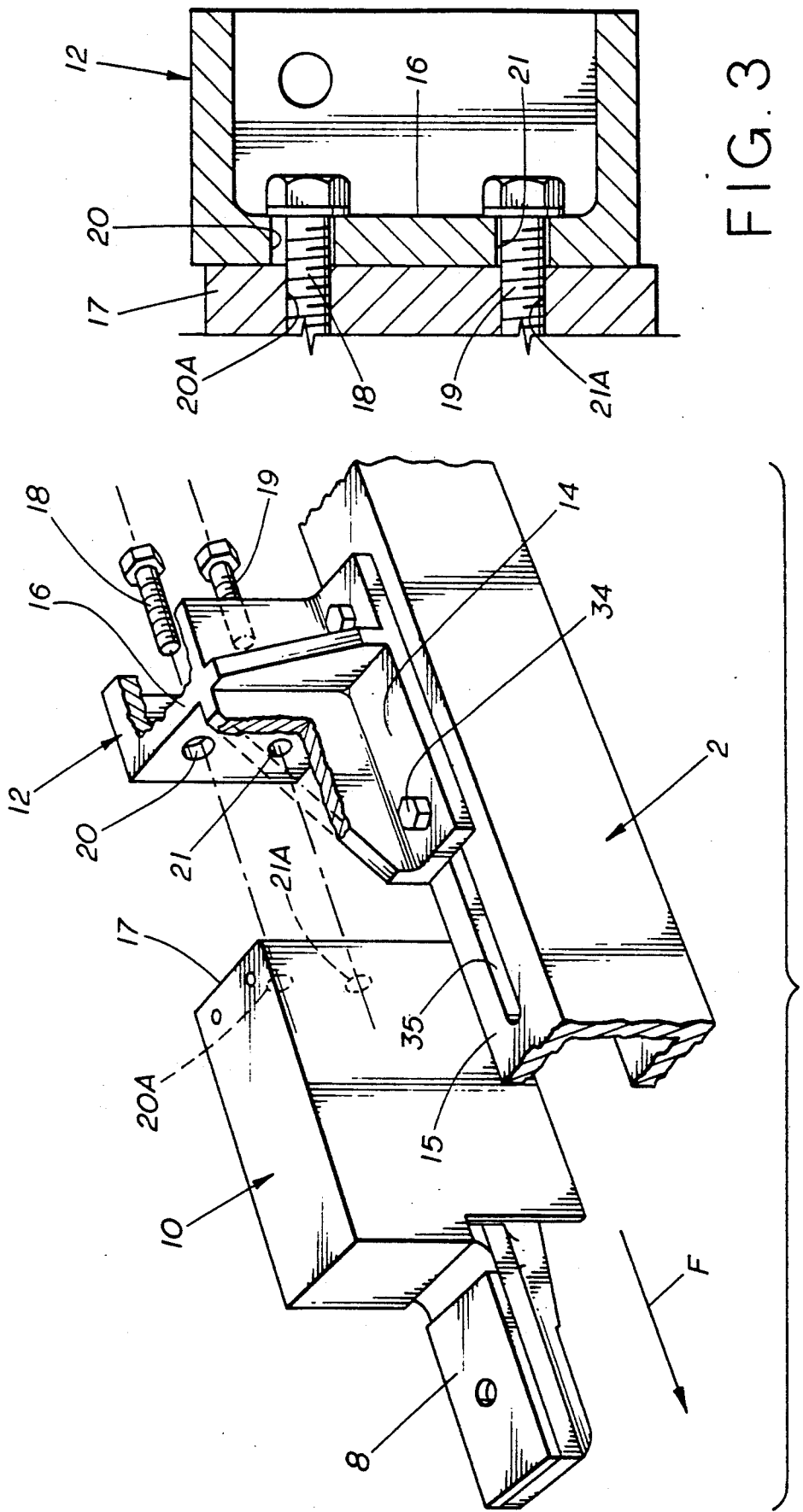

BELT CONVEYOR WEIGHBRIDGE

BACKGROUND OF THE INVENTION

This invention relates to instruments for weighing a section of belt conveyor, and more particularly to so-called belt conveyor weighbridges having load sensing assemblies for producing electrical signals representative of the weight of a section of belt conveyor.

Reference is made to U.S. Pat. No. 4,682,664 disclosing a prior art weighbridge for a conveyor belt assembly. This weighbridge consists of a first cross beam supporting a plurality of idle rolls for carrying a portion of the conveyor belt and the material transported by the belt. It further includes a second cross beam beneath the first which is mounted by the belt. It further includes a second cross beam beneath the first which is mounted on conveyer frame members positioned alongside the conveyor belt for supporting the weighbridge. A pair of load cells on the second crossbeam support the first crossbeam and measure the weight of the desired portion of the conveyor belt.

One problem present in the installation of the prior art weighbridges of the type such as described in U.S. Pat. No. 4,682,664 is that because of manufacturing, fabricating and installation tolerances, misalignment and improper positioning of the weighbridge relative to the axis of movement of the conveyor belt can and often does occur. This results in forces acting both longitudinally and transversely relative to the axis of the direction of motion of the conveyor belt acting upon the weighbridge and inducing stresses in the load sensing assembly that contribute to the load measured by the load sensing assembly. When this occurs the load sensing assembly generates a signal which is intended to be solely representative of the normal force component (e.g., the downward vertical force component for a horizontal conveyor belt) of a portion of the conveyor belt and the material thereon but which in face is representative not only of that downward force but of also of the stress induced by the these lateral forces created on installation of the weighbridge. The cantilevered construction of the load cell illustated in FIG. 2 of U.S. Pat. No. 4,682,664 is designed to enhance vertical resolution of the loads applied to the weighbridge and thus eliminate signals arising from lateral forces. However, so long as such induced forces are present they will contribute at least to some extent to the signals generated by the load cells.

A further problem with prior art weighbridge devices of the type such as shown for example in U.S. Pat. 4,682,664 is that such weighbridges must be designed and manufactured for conveyor belt assemblies of a single specified width. More particularly, a weighbridge built in accordance with the complex desig illustrated in FIG. 1 of U.S. Pat. No. 4,682,664 is of a specified length which can then be accommodated only into a conveyor belt assembly having frame members that will accommodate this particular weighbridge length. Moreover, such weighbridge can support only a limited range of conveyor belt widths. If a conveyor belt assembly having frame members presenting a different width are utilized, then the weighbridge must then be made of another and different length to be useable in that assembly.

SUMMARY OF THE INVENTION

Among the several objects of the invention may be noted the provision of an improved weighbridge which eliminates the creation of longitudinal and transverse lateral forces therein on installation for providing load cell readings more accurately reflective of the weight of the conveyor belt and its load; the provision of such a weighbridge which provides for freedom of movement of the weighbridge on installation for preventing the creation of lateral forces therein and means for securing the weighbridge in place for use while remaining free of induced forces; the provision of such a weighbridge which can be readily for use with conveyor belt assemblies of different widths; and the provision of such a weighbridge which is of economical and durable construction.

In general, a weighbridge of this invention is for use in a conveyor belt assembly for measuring the weight of section of conveyor belt carrying a load of material to be transported along the conveyor belt assembly, with the assembly having frame members positioned longitudinally along the conveyor belt at either side thereof and a plurality of crossmembers extending beneath the conveyor belt transversely of the belt and carried on the frame members for engaging the under side of the conveyor belt for supporting it. The weighbridge comprises one of the crossmembers with said crossmember being mounted for movement of at least one end thereof relative to the adjacent frame member in a direction generally normal to the longitudinal axis of the conveyor belt under the weight of the conveyor belt and with this crossmember constituting a weighbridge crossmember. The weighbridge further comprises a load sensing assembly mounted on the adjacent frame member having a load support portion to which the moveable end of the weighbridge crossmember is detachably secured for supporting the crossmember. Further it includes means for selectively mounting the load sensing assembly on the adjacent frame member in a first position in which the load assembly and weighbridge crossmember are free to move longitudinally and transversely with respect to the adjacent frame member within a limited range of movement and a second position in which the load sensing assembly is affixedly secured on the adjacent frame member against such lateral movement. Thus on installation and adjustment of the weighbridge the mounting means may be moved to its first position allowing the load sensing assembly to relieve longitudinal and transverse forces otherwise induced in the weighbridge and prior to use of the conveyor assembly the mounting means may be moved to its second position for affixedly mounting the load sensing assembly in condition free of induced forces.

Other objects and features will be in part apparent and in part pointed out here in after.

BRIEF DESCRIPTION OF THE DRAWINGS

FIG. 2 is a perspective view, partially exploded, showing a load sensing assembly of the weighbridge and means for mounting this assembly to the adjacent frame member; and FIG. 3 is an enlarged vertical section of a portion of the end face of the load sensing assembly showing details of the attachment of the assembly to the mounting means.

Corresponding reference characters indicate corresponding parts throughout the several views of the drawing.

DESCRIPTION OF THE PREFERRED EMBODIMENT

Figure 1:
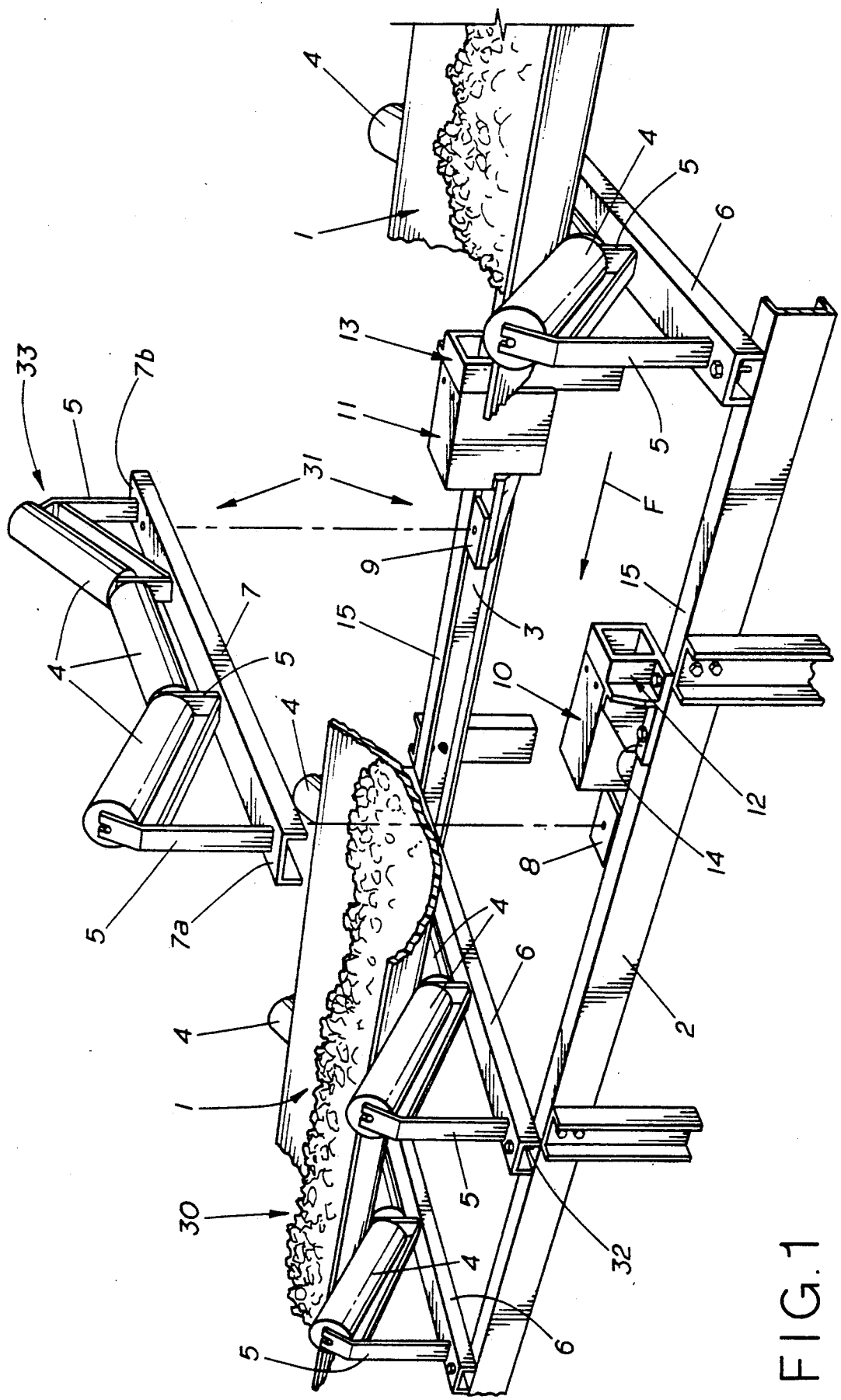
FIG. 1 is a perspective view, partially exploded, showing the weighbridge of this invention as positioned in a conveyor belt assembly extending with its longitudinal axis generally in a horizontal plane and comprising a conveyor belt and frame members positioned longitudinally alongside the belt.

Referring to FIG. 1 of the drawings there is generally indicated at 30 a conveyor belt assembly including a conveyor belt 1 for carrying materials to be transported along the conveyor belt in the direction of it travel as indicated by the arrow F. The conveyor belt is cut away in a central portion thereof in FIG. 1 to show in exploded view the weighbridge 33 of this invention as installed in the conveyor belt assembly. This weighbridge measures the weight of a portion of the conveyor belt and the material thereon, and generates an electrical signal representative of the magnitude of the weight of this load, with these signals to be transmitted and utilized in readout and process control equipment as is conventional in the art.

In FIG. 1, the conveyor belt assembly 1 is shown as being positioned with its longitudinal axis extending in a generally horizontal plane, with the weighbridge 33 oriented generally vertically for measuring the weight (i.e., the downward directional force component) of a portion of the conveyor belt and the material thereon corresponding generally to that which has been cut away in FIG. 1. However, it is to be understood that the conveyor belt assembly may be positioned with its longitudinal axis inclined from the horizontal, with the weighbridge correspondingly being inclined from the vertical to measure the directional force component of the load acting normal to the longitudinal axis of the conveyor belt assembly. Reference hereinafter to the vertical and horizontal directions in connection with the conveyor belt assembly 1, weighbridge 33, and the directional force component of the load applied by the conveyor belt are done to facilitate the description of the structure and operation of the apparatus depicted in FIG. 1. However, such description is not intended to limit the orientation, structure, operation or application of the weighbridge of this invention, with the term horizontal as herein used thus being intended to encompass the term inclinations from the horizontal, the term vertical as herein used thus being intended be encompass to term inclinations from the vertical, and the terms weight and vertical downward force component of the load as herein used thus intended to encompass directional force components acting in a direction inclined from the vertical generally normal to the longitudinal axis of the conveyor belt assembly for orientations of the assembly other than that depicted in the Figs.

The conveyor belt assembly 30 comprises the conveyor belt 1, supporting frame members (e.g., left-side frame member 2 and right-side frame member 3) extending longitudinally alongside the conveyor belt at the sides thereof, a plurality of crossmembers 32 at regularly spaced intervals on the frame members for engaging the underside of the conveyor belt 1 and supporting it. These crossmembers consist of cross beams (e.g., fixed cross beam 6 or vertically moveable weighbridge cross beam 7) extending transversely across the conveyor assembly from one frame member to the other. Typically the crossmembers further include a plurality of idle rolls 4 and supports 5 therefor for holding the axis of rotation of the rolls in a plane extending transversely of the conveyor belt and arranged relative to each other so at to support the conveyor belt in a generally u-shaped configuration. Alternatively the crossmember 32 could include a trough or other means for slideably supporting the conveyor belt, such as described in U.S. Pat. No. 4,682,664. The left-hand and right-hand frame members (2,3 respectively) are preferably constructed of channel material presenting a planar upper surface 15 extending longitudinally in the direction of movement F of te conveyor belt 1.

The weighbridge crossmember 33 of this invention comprises a weighbridge crossbeam 7 of shorter length than the width between the left-hand and right-hand side frame members and is fitted between these frame members. The crossmember 33 further includes idle rolls 4 and supports 5, or alternatively a U-shaped trough (not shown). The weighbridge further includes left-side and right-side load sensing assmeblies (e.g., 10, 11 respectively), and left-side and right-side bracket members (e.g., 12, 13 respectively) for selectively mounting the load sensing assemblies on the frame members 2,3. The load sensing assemblies are generally of the type described for example in co-pending U.S. Patent Application Ser. No. 684,615, filed on Apr. 12, 1991. These assemblies preferably include a load support portion at one end thereof in the direction of movement F of the conveyor belt, and are engageable by the selective mounting means at the opposite ends thereof. The weighbridge cross beam 7 is supported on and detachably secured at its left-side and right-side ends (e.g., 7A, 7B respectively), to the left-side and right-side load support portions 8, 9 of the load sensing assemblies.

As may be readily observed from FIG. 1, the weighbridge crossmember 33 corresponds generally to the other crossmember 32 of the conveyor belt assembly and is adapted for use in the weighbridge by cutting the length of a fixed crossbeam 6 to length so that in use the weighbridge 7 is received between frame members and is adapted to be detachably secured to the load sensing assemblies. Thus in the weighbridge of this invention the weighbridge crossmember 33 can be readily fabricated from one of the other crossmembers 32 already manufactured for the conveyor belt assembly, thereby reducing the cost of the weighbridge crossmember and keeping its construction no more complicated than that of the other crossmembers. In addition, the weighbridge crossmember can readily be made of any length necessary to accommodate the spacing between the left-side and right-side frame members so that a minimum of different length weighbridge crossmembers need be held in inventory for conveyor belt assemblies of different frame widths. Referring now to FIG. 2, the left-side bracket member for selectively mounting the respective load sensing assembly 10 on the adjacent frame member 2 is illustrated. The bracket member comprises a first arm 14 mounted on the adjacent frame member for movement in a longitudinal direction of the conveyer belt assembly through a range of longitudinal positions. This is by means of a slot 35 in the longitudinal upper channel member 15 of the frame member 2 and a plurality of fasteners 34 extending down through holes in the arm 14 and received in the slot 35. Nuts (not shown) threaded on the bolt allow the fasteners to be tightened in any desired position of the arm 14 relative to the slot 35. The bracket member further includes a second arm 16 engageable with a corresponding generally transverse end face 17 of the load sensing assembly. The load sensing assembly may be selectively secured to the bracket member by means of a pair of circular holes (e.g., upper hole 20 and lower hole 21) in the face of the second arm 16 of the bracket member and a pair of circular holes (e.g., upper hole 20A and lower hole 21A) in the end face of the load sensing assembly in register with the holes 20 and 21, and a pair of threaded fasteners 18, 19. These fasteners extend through the holes 20, 21 in the bracket member and are received in threaded engagement in holes 20A, 21A in the load sensing assembly.

As shown in FIGS. 2 and 3, one of the holes in the bracket member (e.g., upper hole 20) is of significantly greater diameter than that of the respective threaded fastener 18. This arrangement enables transverse movement of the load sensing assemblies relative to their respective bracket members when the threaded fastened are not tightened, but prevents such movement when the threaded fasteners 18, 19 have been tightened. Thus the bracket members selectively mount the load sensing assemblies on the respective frame members in a first position in which the load assemblies and weighbridge crossmember are free to move longitudinally and transversely with respect to the adjacent frame members within a limited range of movement and a second position in which the load sensing assemblies and weighbridge crossmembers are affixedly secured to the frame members against such movement.

Thus on installation and adjustment of the weighbridge, the mounting brackets are held in their first positions (and more particularly fasteners 18, 19 and 34 are held in their untightened condition) for enabling the mounting brackets to be moved through a range of positions for allowing the load sensing assembly to relieve any longitudinal and transverse forces which would otherwise be induced in the weighbridge because of misalignment of the conveyor belt assembly components, out of tolerance dimensions of these components, and other difficulties encountered in the fabrication, erection and installation of the conveyor belt assembly components. Once the weighbridge has been properly installed on the frame members, and in preparation for the use of the conveyor belt assembly, the mounting brackets are moved to their second positions (and more particularly the fasteners 18, 19 and 34 are tightened) and thus are secured in place for affixedly mounting the load sensing assemblies and cross beam in condition free of induced longitudinal and transverse forces. Thus the weighbridge is in condition free to measure only the downward directional force component of the portion of the belt and the associated load of material to be measured by the weighbridge. This gives a more accurate and reliable reading of the load than possible in the prior art devices in which residual longitudinal and transverse forces from the weighbridge installation processes are allowed to be induced and remain in the weighbridge.

While the weighbridge cross beam 7 has been shown and described as being free to move vertically with respect to the frame members at both ends of the cross beam, it is contemplated that the crossbeam may be pivotally mounted at one end thereof to one frame member and free to move vertically only at the opposite end with respect to the other frame member. In this embodiment, a single load sensing assembly would be provided on the frame member adjacent the free end of the weighbridge cross beam. similarly while the load sensing assembly is shown as being installed with its load support portion at the downstream end thereof with respect to the direction of motion F of the conveyor belt 1, it is contemplated that the load sensing assemblies could be installed in the opposite orientation, with the load support portion thus at the upstream and thereof. Further, FIGS. 2 and 3 show bores 20 and 21 in the arm 16 of the bracket member and threaded bores 20A, 21A in the end face of the load sensing assembly, with the upper bore 20 in the arm 16 of larger diameter than the corresponding threaded fastener 18. However, it contemplated within the scope of this invention that the bores 20A and 21A in the end face of the load sensing assembly not be threaded, but that the bores 20 and 21 in the arm 16 be threaded or that nuts be provided for enabling the fasteners to be tightened. Similarly, it is contemplated that the bore of larger diameter than the corresponding threaded fastener may be the lower hole in either the load sensing assembly or bracket member. Lasly, while the preferred means for selectively mounting the load sensing assembly on the adjacent frame member has been shown and described above, other known selective mounting means are contemplate within the scope of this invention.

In view of the above, it will be seen that the several objects of the invention are achieved and other advantageous results obtained.

As various changes could be made in the above constructions without departing from the scope of the invention it is intended that all matter contained in the above description are shown in the accompanying drawings shall be interpreted as illustrative and not in a limiting sense.

What is claimed is:

1. A weighbridge for a conveyor belt assembly for measuring a weight of a section of conveyor belt carrying a load of material to be transported along the conveyor belt assembly, with said assembly having frame members positioned longitudinally alongside the conveyor belt at opposite sides thereof and a plurality of crossmembers extending beneath the conveyor belt transversely thereof and carried on the frame members for engaging an underside of the conveyor belt and supporting said conveyor belt, said weighbridge comprising:

A) one of said crossmembers, with said member being mounted for movement of at least one end thereof relative to an adjacent frame member in a direction generally normal to an longitudinal axis of said conveyor belt under the weight of the conveyor belt and constituting a weighbridge crossmember;

B) a load sensing assembly mounted on said adjacent frame member having a load support portion to which the movable end of the weighbridge crossmember is detachably secured for supporting the crossmember; and C) means for selectively mounting the load sensing assembly on said adjacent frame member in a first position in which the load assembly and weighbridge crossmember are free to move longitudinally and transversely with respect to said adjacent frame member within a limited range of movement, and a second adjacent frame member against such movement, whereby on installation and adjustment of the weighbridge the mounting means is moved to its first position allowing the load sensing assembly to relieve longitudinal and transverse forces otherwise induced in the weighbridge, and prior to use of the conveyor assembly the mounting means is moved to said second position for affixedly mounting the load sensing assembly in condition free of induced longitudinal and transverse forces.

2. The weighbridge of claim 1 wherein the weighbridge crossmember comprises a plurality of rollers having axes of rotation contained in a plane extending transversely of the conveyor belt and arranged relative to each other so as to support the conveyor belt in a generally U-shaped configuration.

3. The weighbridge of claim 1 wherein the load sensing assembly has a load support portion at one end thereof in an direction of movement of the conveyor belt and engages said mounting means at the opposite end thereof.

4. The weighbridge of claim 3 wherein the mounting means comprises a bracket member having a first arm mounted on said adjacent frame member and a second arm engageable with said opposite end of the load sensing assembly.

5. The weighbridge of claim 4 wherein the first arm of the bracket member is mounted on said adjacent frame member for movement in the longitudinal direction thereof through a range of longitudinal positions, and said mounting means further comprises selective securing means for securing the first arm in any longitudinal position on said adjacent frame member within said range of positions.

6. The weighbridge of claim 4 wherein the second arm of the bracket member comprises a generally transverse face engageable with a corresponding generally transverse end face of the load sensing assembly.

7. The weighbridge of claim 6 wherein said mounting means further comprises a pair of circular holes in a face of the second arm of a bracket member with one hole positioned above an other, and a pair of circular holes in an end face of the load sensing assembly in register with the pair of holes in the bracket member.

8. The weighbridge of claim 7 wherein the mounting means further comprises a pair of threaded fasteners received in the registering pair of holes in the bracket member and the end face of the load sensing assembly.

9. The weighbridge of claim 8 wherein at least one hole of the registering pair of holes in the bracket member and load sensing assembly is of significantly greater diameter than that of the threaded fastener for enabling transverse movement of the load sensing assembly relative to bracket member when the threaded fastener is not tightened but prevents such movement when the threaded fastener has been tightened.

10. The weighbridge of claim 1 wherein the weighbridge crossmember in movable at both ends relative to the frame members in a direction generally normal to the longitudinal axis of the conveyor belt and said weighbridge further comprises a pair of said load sensing assemblies and a pair of said mounting means.

* * * * *

UNITED STATES PATENT AND TRADEMARK OFFICE
CERTIFICATE OF CORRECTION

PATENT NO. : 5,111,896
DATED : May 12, 1992
INVENTOR(S) : Vincenzo Porcari and Gianluigi Riva It is certified that error appears in the above-identified patent and that said Letters Patent is hereby corrected as shown below:

```
Column 3, Line 14 - "it" should be -- its --
Column 3, Line 50 - "to" should be -- the --
Column 4, Line  4 - "at" should be -- as --
Column 4, Line 12 - "te" should be -- the --
Column 4, Line 20 - "assmeblies" should be -- assemblies --
Column 5, Line 68 - "similarly" should be -- Similarly --
Column 6, Line  6 - "and" should be -- end --
Column 6, Line 20 - "Lasly" should be -- Lastly --

Column 6, Line 31 - "are" should be -- and --
Column 6, Line 63 - "second adjacent" should be -- second
                    position in which the load sensing assembly
                    is affixedly secured on said adjacent --
```

Signed and Sealed this

Twenty-sixth Day of September, 1995

Attest:

BRUCE LEHMAN

*Attesting Officer*   *Commissioner of Patents and Trademarks*